(12) United States Patent
Schroiff et al.

(10) Patent No.: US 9,063,957 B2
(45) Date of Patent: Jun. 23, 2015

(54) QUERY SYSTEMS

(75) Inventors: Klaus Schroiff, Munich (DE); Vitaliy Ryumshyn, Puchheim (DE); Christoph Held, Vaterstetten (DE); Kristof Nast-Kolb, Pöcking (DE)

(73) Assignee: FUJITSU LIMITED, Kawasaki (JP)

( * ) Notice: Subject to any disclaimer, the term of this patent is extended or adjusted under 35 U.S.C. 154(b) by 288 days.

(21) Appl. No.: 13/323,301

(22) Filed: Dec. 12, 2011

(65) Prior Publication Data

US 2012/0158692 A1 Jun. 21, 2012

(30) Foreign Application Priority Data

Dec. 13, 2010 (EP) .................................... 10194766

(51) Int. Cl.
*G06F 7/00* (2006.01)
*G06F 17/30* (2006.01)
*G06F 17/00* (2006.01)

(52) U.S. Cl.
CPC .... *G06F 17/30286* (2013.01); *G06F 17/30893* (2013.01)

(58) Field of Classification Search
None
See application file for complete search history.

(56) References Cited

U.S. PATENT DOCUMENTS

| | | | |
|---|---|---|---|
| 6,009,422 A | 12/1999 | Ciccarelli | |
| 6,931,396 B1 | 8/2005 | Topaloglou et al. | |
| 8,195,630 B2 * | 6/2012 | Ellis et al. | 707/696 |
| 8,458,189 B1 * | 6/2013 | Ludwig et al. | 707/741 |
| 8,489,573 B2 * | 7/2013 | Bain | 707/706 |
| 8,504,553 B2 * | 8/2013 | Vailaya et al. | 707/711 |
| 8,589,387 B1 * | 11/2013 | Brin | 707/723 |
| 2002/0129145 A1 * | 9/2002 | Chow | 709/225 |
| 2003/0084035 A1 | 5/2003 | Emerick, III | |
| 2004/0083194 A1 | 4/2004 | Wu et al. | |
| 2006/0074881 A1 * | 4/2006 | Vembu et al. | 707/3 |
| 2007/0244865 A1 | 10/2007 | Gordon et al. | |
| 2008/0306913 A1 * | 12/2008 | Newman et al. | 707/3 |
| 2009/0248619 A1 | 10/2009 | Das et al. | |

FOREIGN PATENT DOCUMENTS

| | | |
|---|---|---|
| EP | 1626357 A2 | 2/2006 |
| EP | 2110781 A1 | 10/2009 |
| EP | 2182448 A1 | 5/2010 |
| WO | 2004/095428 A2 | 11/2004 |
| WO | 2008/005520 A2 | 1/2008 |
| WO | 2009/114714 A2 | 9/2009 |

OTHER PUBLICATIONS

Japanese Office Action issued Mar. 31, 2015 for corresponding Japanese Patent Application No. 2011-271479.

* cited by examiner

*Primary Examiner* — Alicia Willoughby
*Assistant Examiner* — Susan F Rayyan
(74) *Attorney, Agent, or Firm* — Staas & Halsey LLP

(57) ABSTRACT

A query system for carrying out a query process corresponding to a received query element on a database system and/or a search-engine system, the query system comprising: a synchronization unit operable, as a non-text-centric synchronization process, to convert a non-text-centric data entry of the database system into a corresponding text-centric data entry representative of that non-text-centric data entry, and to enter the text-centric data entry into an index of the search-engine system so that the non-text-centric data entry of the database system is available to both the search-engine and database systems.

10 Claims, 10 Drawing Sheets

| PrimaryKey | Owner (String) | PhoneNumber (Integer) |
|---|---|---|
| 4873328390 | Harry Hirsch | 2402333333 |
| 4873328391 | Harry Hirsch's Wife | 2402333333 |
| 4873328392 | Harry Hirsch's Wife | 1511111111 |
| 4873328393 | Harry Hirsch | 1512222222 |

FIG. 4

| Word | Document |
|---|---|
| PhoneNumbers/Owner=Harry Hirsch | 4873328390, 4873328393 |
| PhoneNumbers/PhoneNumber=2402333333 | 4873328390, 4873328391 |
| PhoneNumbers/Owner=Harry Hirsch's Wife | 4873328391, 4873328392 |
| PhoneNumbers/PhoneNumber=1511111111 | 4873328392 |
| PhoneNumbers/PhoneNumber=1512222222 | 4873328393 |

FIG. 5

DB centric → select people.lastName, people.firstName, people.employer, skills.resume from people, skills where
people.birthDate='19[5|6][0....9]/??/??' ← search engine centric
and
people.firstName='Jack~' ←
and
skills.summary='*engineer* [chemistry|electrical|geo]' ← search engine centric
and
→ people.id=skill.peopleId
group by
→ people.employer

FIG. 10

QUERY SYSTEMS

CROSS REFERENCE TO RELATED APPLICATIONS

This application claims the benefit of European Application No. 10194766.1, filed Dec. 13, 2010, the disclosure of which is incorporated herein by reference.

BACKGROUND

The present invention relates to query systems.

In particular, the present invention relates to query systems which make use of data-handling systems of different types, for example database systems and search-engine systems. The present invention relates to aspects of the database and search-engine environments, without being solely part of either environment.

A database may be considered to consist of a collection of data organised for one or more purposes, typically in digital form. Databases may be classified by the type of their contents, for example: bibliographic, document-text, statistical. Digital databases are typically managed using database management systems (DBMS), which store database contents, allowing data creation and maintenance, and search and other access.

A database management system (DBMS) typically consists of software that operates databases, providing storage, access, security, backup and other facilities. Database management systems can be categorised according to the database model that they support, such as relational or XML (Extensible Markup Language), the type(s) of computer they support, such as a server cluster or a mobile phone, the query language(s) that access the database, such as SQL (Structured Query Language) or XQuery, or performance trade-offs, such as maximum scale or maximum speed or others. Some DBMSs cover more than one entry in these categories, e.g. supporting multiple query languages.

SQL is a database computer language designed for managing data in relational database management systems (RDBMS). XQuery is a query and functional programming language that is designed to query collections of XML data.

A relational database management system (RDBMS) is typically based on a set of tables (also called "relations") containing data according to one or more data categories per table column. Each row of a table contains an instance of data. The data domain of possible values can be specified, as well as constraints for each column, during the creation of the database. A table of metadata may store the formal definitions of the database tables, table columns, data domains as well as data constraints.

Typical examples of RDBMSs are IBM DB2, MySQL, Sysbase Database or the Oracle Database. SQL is a typical language used in RDBMSs for data manipulation, i.e. as a DML (Data Manipulation Language). Some databases are enhanced with proprietary search-engine aspects, but functionality is typically limited.

In relation to the object-oriented programming paradigm, object-oriented databases have been considered. An object-oriented database management system (OODBMS) or object database management system (ODBMS) may be considered to be a database management system (DBMS) based on the modelling and creation of data as objects. Such systems may support object classes, class inheritance (polymorphism) and associations between objects. An object class defines a set of attributes according to a data domain.

Examples of OODBMSs are Fujitsu Enabler, ObjectDB and ObjectStore. Typically, ODQL (Object Database Query Language) or OQL (Object Query Language) is used as a query language in such systems, although XQuery and OCL (Object Constraint Language) are other options.

The above-mentioned languages themselves are well-known, and thus further detailed information concerning them (syntax, grammar, etc.) is not included here.

A typical database query language can be divided into different aspects, for example: data selection (filtering); data projection; data traversing; joining data; cross product; and others. A specific query language may not cover all such aspects. For example, data traversal may be a feature in an OODBMS but may not be present in an RDBMS.

SUMMARY

The present invention may apply to the above-mentioned types of database, and may also apply to other database types.

In general, search engines provide an interface to a group of items that enables users to specify criteria about items of interest and have the engine find the matching items. The search criteria are typically referred to as a query, for example as a search query. In the case of text search engines, the search query is typically expressed as a set of words that identify the desired concept that one or more documents may contain.

There are several styles of search query syntax that vary in strictness. Whereas some text search engines require users to enter two or three words separated by white space, other search engines may enable users to specify entire documents, pictures, sounds, and various forms of natural language. Some search engines apply improvements to search queries to increase the likelihood of providing a quality set of items through a process known as query expansion.

One type of search engine is an index-based search engine. Such a search engine may be considered to be a system or component for querying keywords based on a document index. The document index is created by parsing documents or other text sources and storing its key information to index storage. Among the more popular search engines are Apache Lucene (Compass), Ht://dig or ISearch.

The list of items that meet the criteria specified by the query is typically sorted, or ranked. Ranking items by relevance (from highest to lowest) reduces the time required to find the desired information. Probabilistic search engines rank items based on measures of similarity (between each item and the query, typically on a scale of 1 to 0, 1 being most similar) and sometimes popularity or authority, or use relevance feedback. Boolean search engines typically only return items which match exactly without regard to order, although the term "Boolean search engine" may simply refer to the use of Boolean-style syntax (the use of operators AND, OR, NOT, and XOR) in a probabilistic context.

To provide a set of matching items that are sorted according to some criteria quickly, a search engine will typically collect metadata about the group of items under consideration beforehand through a process referred to as "indexing" or "text-indexing" (generating a document index). The index often (in the case of previously-considered search engines) requires a smaller amount of computer storage, which is why some search engines only store the indexed information and not the full content of each item, and instead provide a method of navigating to the items in the search engine result page.

A search engine may store a copy of each item in a cache so that users can see the state of the item at the time it was indexed, or for archive purposes, or to make repetitive processes work more efficiently and quickly.

Other types of search engine do not store an index. So-called "crawler" or "spider type" search engines (often referred to as real-time search engines) may collect and assess items at the time of executing a search query, dynamically considering additional items based on the contents of a starting item (known as a seed, or seed URL in the case of an Internet crawler). Meta search engines store neither an index nor a cache, and instead simply reuse the index or results of one or more other search engines to provide an aggregated, final set of results.

The term "data handling system" (DHS) may be considered to be an umbrella term for both search engines (search-engine systems) and databases (database systems).

Problems exist in such considered database and search-engine systems.

Previously-considered databases handle data attributes according to a fixed data domain based on a standardized query language (for example, SQL or XQuery). This is done in order to be able to perform a high performance, type-safe query on a column or object class. However, such databases offer only a small set of functions on text attributes compared to search engines. Furthermore, object-oriented databases have a comparatively low performance with respect to table-centric data results.

As a first example, a PDF document may be associated to a data entry (data entity). Such a document may be stored to a BLOB (binary large object) attribute. However, the performance of a text-centric query function on a BLOB attribute may be problematic. For example, when looking for the occurrence of a word within a list of stored PDF documents it may be necessary to load all PDF documents from a database server into a client machine, and then extract the text information and perform the lookup for the target word. Such an operation may be expensive (in terms of resources), because of the huge amount of network traffic necessary to transfer all of the PDF documents plus the extra efforts of interpreting the data on-the-fly.

The performance of a database is largely dependent on data indexing or "key-indexing". Such indexing (key-indexing) may be acceptable for simple data types or combinations of simple data types, but BLOB types are typically not indexed within a database. Even if a text query on such a data type existed (for example, by way of proprietary database extensions), it would result in a full table scan which would deteriorate the database performance.

As a second example, an entity (data entry) may contain a string attribute containing a sequence like "abcd". It may be desirable to know whether this string matches a regular expression like "(a(b)c)d". Similar considerations relate to the performance of a regular expression on date (e.g. 01/05/200[4|6]) or numerical values. Most standard query languages such as SQL or XQuery do not support such operations. Some database extensions to the query language have been considered (which operate via the query language or as stored procedures) which have uses restricted to certain data types.

As a third example, ODBMS typically have a comparatively low query performance specifically when executing queries with a table-like result set. While this use-case should be implemented based on an RDBMS, such a choice is often not available or may not have been provided in favour of other features of an ODBMS.

As a fourth example, assuming an environment without constraints, end-users may have a different approach to data queries from that of databases. End-users tend to approach queries in an unstructured way. For example, end-users typically find operation of an Internet search engine to be intuitive, whereas few are able to filter data from a database such as an RDBMS with the same level of ease.

As a fifth example, a number of previously-considered databases feature proprietary extensions to their native scope. They can, for instance, use search-engine features on CLOBs (Character Large Objects). However, they employ their native database scheme for other data types.

Regarding search engines, such systems are typically not constrained by data domains and are typically highly flexible with respect to text-centric operations. However, search engines are typically not intended to function as a database, typically not storing the complete source content. It is also typically not possible to design relationships between data instances. Search engines also typically do not have reference to a specific domain model either—instead, all data is handled as text rendering them not type-safe in the way that a database normally would be. Within their specific scope (text-based or text-centric searching), however, search engines are considered to be fast and flexible.

It is desirable to solve one or more problems found in such systems. It is desirable to provide query systems, and related methods and computer programs, which provide advantages over the previously-considered systems.

There is disclosed herein a query system, comprising: analysing unit operable to analyse a query element, for use in carrying out a query process corresponding to that query element; and determining unit operable to determine, in dependence upon such analysis, whether to carry out the query process on a first data handling system and/or a second data handling system different in type from the first data handling system.

According to an embodiment of a first aspect of the present invention, there is provided a query system, comprising: analysing unit operable to analyse a query element, for use in carrying out a query process corresponding to that query element; and determining unit operable to determine, in dependence upon such analysis, whether to carry out the query process on a database system and/or a search-engine system.

Such a query system may be a computer-implemented query system. For example, it may be implemented by way of software running on computing apparatus. Such apparatus may be in the form of a single device, or distributed across a plurality of devices.

Such a query system may be implemented in hardware, or partly by way of software running on computing apparatus and partly in hardware.

With such a query system, it may be possible to take advantage of the capabilities of both the database system and the search-engine system, and in particular to analyse a received query to determine which of those is most suitable in the circumstances.

The system may thus determine whether to carry out the query process on the database system, or on the search-engine system, or on both the database system and the search-engine system. Both systems may be used, for example, if it is unknown in advance which might perform the best.

The query system may comprise execution unit operable to carry out the query process on the database system, when it is determined that the query process is to be carried out on the database system, or on the search-engine system, when it is determined that the query process is to be carried out on the search-engine system.

The query system may comprise synchronisation unit operable, as a non-text-centric synchronisation process, to convert a non-text-centric data entry of the database system into a corresponding text-centric data entry representative of that non-text-centric data entry, and to enter the text-centric data entry into an index of the search-engine system, preferably together with correspondence information associating the or each index entry in the index resulting from that text-centric data entry to its corresponding non-text-centric data entry of the database system.

Such a non-text-centric data entry may be a data entry that is recorded in a format that is not based around or used to represent text as such. Such a non-text-centric data entry may for example be an integer, double, date, Boolean, or the like.

Such a text-centric data entry may be a string of text, for example data of data type "string". A string is generally understood as a data type storing a sequence of data values, in which elements usually stand for characters according to a character encoding.

For example, in the context of a date, the non-text-centric data entry may be an integer representing the date as the number of seconds or millisecond since a reference point in time. The corresponding text-centric data entry may be a string of text, such as "2010/01/05 PDT 10:50:50", representing the same date.

The synchronisation unit may be operable to carry out the non-text-centric synchronisation process in respect of all non-text-centric entries of the database system. Thus, all non-text-centric entries of the database may have corresponding entries in the index of the search engine, so that the query system is operable to access all non-text-centric data entries by way of the database system or the search-engine system, or both.

The query system may comprise synchronisation unit operable, as a text-centric synchronisation process, to enter a text-centric data entry of the database system into the index of the search-engine system together with correspondence information associating the or each index entry in the index resulting from that text-centric data entry to its corresponding text-centric data entry of the database system.

The synchronisation unit may be operable to carry out the text-centric synchronisation process in respect of all text-centric entries of the database system. Thus, all text-centric entries of the database may have corresponding entries in the index of the search engine, so that the query system is operable to access all text-centric data entries by way of the database system or the search-engine system, or both.

Indeed, it will be appreciated that the query system may thus be operable to access all data entries by way of the database system or the search-engine system, or both.

Although the synchronisation unit may be operable to carry out the non-text-centric synchronisation process in respect of all non-text-centric entries of the database system, it may be operable to carry out the non-text-centric synchronisation process in respect of a plurality of the non-text-centric entries of the database system, or a subset of the non-text-centric entries of the database system, or in respect of all non-text-centric entries of the database system of a particular type.

Although the synchronisation unit may be operable to carry out the text-centric synchronisation process in respect of all text-centric entries of the database system, it may be operable to carry out the text-centric synchronisation process in respect of a plurality of the text-centric entries of the database system, or a subset of the text-centric entries of the database system, or in respect of all text-centric entries of the database system of a particular type.

Such entry into the index of the search-engine system may be carried out on a per transaction basis, for example as and when changes are made in the database system, or on a scheduled basis, for example as part of a synchronisation process performed from time to time, or on a just-in-time or on-demand basis, for example as and when a query is received.

The synchronisation unit may be operable, when a change is made to information searchable by the query system, to cause the change to be represented in both the database system and the search-engine system. Such a change may be the creation of a new data entry, the updating of an existing data entry or the deletion of an existing data entry.

The determining unit may be operable, if the analysis indicates that the query element relates to a search expression supported by the database system, to determine that the query process is to be carried out on the database system.

The determining unit may be operable, if the analysis indicates that the query element relates to a search expression not supported by the database system but supported by the search-engine system, to determine that the query process is to be carried out on the search-engine system.

The determining unit may be operable, if the analysis indicates that the query element relates to a search-engine-centric selection operation, to determine that the query process is to be carried out on the search-engine system.

The query system may comprise query-dividing unit operable to divide a received query into a plurality of component query elements. The query system may be operable to carry out such a query process per query element.

The query system may comprise queuing unit operable to queue the plurality of query elements in an order dependent upon the received query. The query system may be operable to carry out such a query process per query element in the order.

The query system may comprise the database and search-engine systems, or may be provided without the database and search-engine systems and be configured to interact with such database and search-engine systems.

According to an embodiment of a second aspect of the present invention, there is provided a (e.g. computer-implemented) query method, comprising: analysing a query element, for use in carrying out a query process corresponding to that query element; and determining, in dependence upon such analysis, whether to carry out the query process on a database system and/or a search-engine system.

According to an embodiment of a third aspect of the present invention, there is provided a computer program which, when executed on computing apparatus, causes the apparatus to carry out a query method, the method comprising: analysing a query element, for use in carrying out a query process corresponding to that query element; and determining, in dependence upon such analysis, whether to carry out the query process on a database system and/or a search-engine system.

Such a computer program may be provided as a single program or as a suite of programs. Such a computer program may be executed on a single computing device or across more than one computing device. That is, such computing apparatus may be distributed across a network or the like.

According to an embodiment of a fourth aspect of the present invention, there is provided a query system for carrying out a query process corresponding to a received query element (selectively) on a database system and/or a search-engine system, the query system comprising: synchronisation unit operable, as a non-text-centric synchronisation process, to convert a non-text-centric data entry of the database system into a corresponding text-centric data entry representative of that non-text-centric data entry, and to enter the text-centric data entry into an index of the search-engine system (so that the non-text-centric data entry of the database system is available to both the search-engine and database systems).

Such a query system may enable the performance and/or flexibility of a query (which may be formed of one or more query elements) to be increased.

Such a query system may be a computer-implemented query system. For example, it may be implemented by way of software running on computing apparatus. Such apparatus may be in the form of a single device, or distributed across a plurality of devices.

Such a query system may be implemented in hardware, or partly by way of software running on computing apparatus and partly in hardware.

With such a query system, it may be possible to take advantage of the capabilities of both the database system and the search-engine system, and in particular to employ the search-engine system to search for data entries which might otherwise only by searchable by way of the database system.

Such a non-text-centric data entry may be a data entry that is recorded in a format that is not based around or used to represent text as such. Such a non-text-centric data entry may for example be an integer or an array.

Such a text-centric data entry may be a string of text, for example data of data type "string". A string is generally understood as a data type storing a sequence of data values, in which elements usually stand for characters according to a character encoding.

For example, in the context of a date, the non-text-centric data entry may be an integer representing the date as the number of seconds or millisecond since a reference point in time. The corresponding text-centric data entry may be a string of text, such as "2010/01/05 PDT 10:50:50", representing the same date.

The synchronisation unit may be operable, in the non-text-centric synchronisation process, to enter the text-centric data entry into the index of the search-engine system together with correspondence information associating the or each index entry in the index resulting from that text-centric data entry to its corresponding non-text-centric data entry of the database system. Such correspondence information may enable entries of the database and search-engine systems to be related to one another, or cross-referenced to one another, or linked to one another.

The synchronisation unit may be operable to carry out the non-text-centric synchronisation process in respect of all non-text-centric entries of the database system. Thus, all non-text-centric entries of the database may have corresponding entries in the index of the search engine, so that the query system is operable to access all non-text-centric data entries by way of the database system or the search-engine system, or both.

The query system may comprise synchronisation unit operable, as a text-centric synchronisation process, to enter a text-centric data entry of the database system into the index of the search-engine system, preferably together with correspondence information associating the or each index entry in the index resulting from that text-centric data entry to its corresponding text-centric data entry of the database system.

The synchronisation unit may be operable to carry out the text-centric synchronisation process in respect of all text-centric entries of the database system. Thus, all text-centric entries of the database may have corresponding entries in the index of the search engine, so that the query system is operable to access all text-centric data entries by way of the database system or the search-engine system, or both.

Indeed, it will be appreciated that the query system may thus be operable to access all data entries by way of the database system or the search-engine system, or both.

Although the synchronisation unit may be operable to carry out the non-text-centric synchronisation process in respect of all non-text-centric entries of the database system, it may be operable to carry out the non-text-centric synchronisation process in respect of a plurality of the non-text-centric entries of the database system, or a subset of the non-text-centric entries of the database system, or in respect of all non-text-centric entries of the database system of a particular type.

Although the synchronisation unit may be operable to carry out the text-centric synchronisation process in respect of all text-centric entries of the database system, it may be operable to carry out the text-centric synchronisation process in respect of a plurality of the text-centric entries of the database system, or a subset of the text-centric entries of the database system, or in respect of all text-centric entries of the database system of a particular type.

Such entry into the index of the search-engine system may be carried out on a per transaction basis, for example as and when changes are made in the database system, or on a scheduled basis, for example as part of a synchronisation process performed from time to time, or on a just-in-time or on-demand basis, for example as and when a query is received.

The synchronisation unit may be operable, when a change is made to information searchable by the query system, to cause the change to be represented in both the database system and the search-engine system. Such a change may be the creation of a new data entry, the updating of an existing data entry or the deletion of an existing data entry.

The query system may further comprise: analysing unit operable to analyse the query element, for use in carrying out the query process corresponding to that query element; and determining unit operable to determine, in dependence upon such analysis, whether to carry out the query process on the database system and/or the search-engine system.

The system may thus determine whether to carry out the query process on the database system, or on the search-engine system, or on both the database system and the search-engine system. Both systems may be used, for example, if it is unknown in advance which might perform the best.

The determining unit may be operable, if the analysis indicates that the query element relates to a search expression supported by the database system, to determine that the query process is to be carried out on the database system.

The determining unit may be operable, if the analysis indicates that the query element relates to a search expression not supported by the database system but supported by the search-engine system, to determine that the query process is to be carried out on the search-engine system.

The determining unit may be operable, if the analysis indicates that the query element relates to a search-engine-centric selection operation, to determine that the query process is to be carried out on the search-engine system.

The query system may further comprise execution unit operable to carry out the query process on the database system, when it is determined that the query process is to be carried out on the database system, and/or on the search-engine system, when it is determined that the query process is to be carried out on the search-engine system.

The query system may comprise query-dividing unit operable to divide a received query into a plurality of component query elements. The query system may be operable to carry out such a query process per query element.

The query system may comprise queuing unit operable to queue the plurality of query elements in an order dependent upon the received query. The query system may be operable to carry out such a query process per query element in the order.

The query system may comprise the database and search-engine systems, or may be provided without the database and search-engine systems and be configured to interact with such database and search-engine systems.

According to an embodiment of a fifth aspect of the present invention, there is provided a query-system (e.g. computer-implemented) method for use in a query system, the query system being for carrying out a query process corresponding to a received query element on a database system and/or a search-engine system, the method comprising: as a non-text-centric synchronisation process, converting a non-text-centric data entry of the database system into a corresponding text-centric data entry representative of that non-text-centric data entry, and entering the text-centric data entry into an index of the search-engine system (so that the non-text-centric data entry of the database system is available to both the search-engine and database systems).

According to an embodiment of a sixth aspect of the present invention, there is provided a computer program which, when executed on computing apparatus of a query system, the query system being for carrying out a query process corresponding to a received query element on a database system and/or a search-engine system, causes the apparatus to carry out a query-system method, the method comprising: as a non-text-centric synchronisation process, converting a non-text-centric data entry of the database system into a corresponding text-centric data entry representative of that non-text-centric data entry, and entering the text-centric data entry into an index of the search-engine system (so that the non-text-centric data entry of the database system is available to both the search-engine and database systems).

Such a computer program may be provided as a single program or as a suite of programs. Such a computer program may be executed on a single computing device or across more than one computing device. That is, such computing apparatus may be distributed across a network or the like.

The phrase "text-centric" may be interpreted to mean "unstructured" or "text-based" or "text-like" or "textual" or "user-focussed" or "string-type". For example, a text-centric data entry may be one which is in a format readily readable or understandable by a human user, for example in a format suitable for display to a user.

The phrase "non-text-centric" may be interpreted to mean "structured" or "non-text-based" or "non-text-like" or "non-textual" or "machine-focussed" or "non-string-type". For example, a non-text-centric data entry may be one which is in a format which is not readily readable or understandable by a human user, for example in a format which is aimed at enabling a computer system such as a database system to operate effectively and which would need conversion to be suitable for display to a user (i.e. to be user-friendly).

A text-centric data entry could be described as an entry mostly or completely containing unstructured/information data. This "unstructured" data may have a high semantic quality (it may be aligned with user interest and, consequently, there may be a high probability that the text-centric data entry itself, perhaps in part, forms part of user queries). In contrast, a non-text-centric data entry may be described as an entry mostly or completely containing "structured" data, for example conforming to the strict rules of representation and format imposed by the database (such as defined in its data model).

A data entry "of" the database system or the search-engine system may be interpreted as being one which is already stored in the system concerned, or one which is about to be (or expected to be, or to be) stored in the system concerned.

The search-engine system may be a text or text-based search-engine system, and may be an index-based search-engine system.

An "index" in the case of a search-engine system may be interpreted broadly, and need not be restricted to a plain list. A so-called "T-tree" is a "balanced index tree data structure" which may be used by database systems, and therefore also by other systems. A search-engine system in the present context may preferably be updated against (synchronised with) a database system via a batch-job process (as apposed to on-the-fly).

Features of system aspects apply to method and computer program aspects, and vice versa.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is an example of a simple table (entitled "Phone-Numbers") which may be realised in a relational database;

FIG. 5 presents an "inverted index" corresponding to the table of FIG. 4;

FIG. 10 represents an example complex query; and

DETAILED DESCRIPTION OF THE PREFERRED EMBODIMENT

Figure 1:
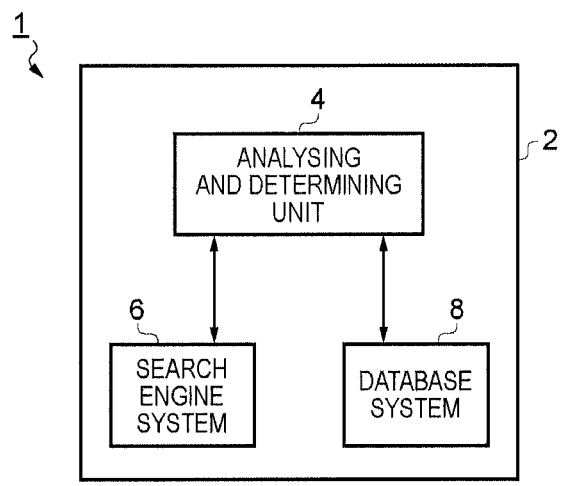
FIG. 1 is a schematic diagram of a query system.

Reference will now be made in detail to the preferred embodiments, examples of which are illustrated in the accompanying drawings, wherein like reference numerals refer to like elements throughout.

By way of introduction, embodiments of the present invention employ a hybrid-query approach which combines both the structural advantages of a database system (e.g. a DBMS) with the text-query capabilities of a (secondary) search-engine system, in order to overcome performance problems and/or limited query capabilities in certain scenarios.

The approach may be considered to be targeting "text-centric" or "text-based" applications, as opposed to number-centric or generic applications. The latter are usually well-served by previously-considered database systems alone, whereas database text-centric applications are usually not well-supported by database query languages.

Typical examples of "text-centric" applications are team-collaboration systems, social networks, requirement-management systems or document systems.

Some embodiments of the present invention use an enhanced or dedicated query language or API (Application Programming Interface) on a client machine (in the context of a network-based embodiment). The query interpreter (implemented in the client machine) can decide which portions of a query operation can be "better" processed by either of two target query engines (search engine and database), which engines may for example be implemented remotely from the client machine on corresponding separate servers.

FIG. 1 is a schematic diagram of a query system 1.

Query system 1 comprises a local device 2, which may be a computing device such as a computer system. The local device 2 comprises analysing and determining unit 4, a search-engine system 6 and a database system 8.

The analysing unit is operable to analyse a query element, for use in carrying out a query process corresponding to that query element. The determining unit is operable to determine, in dependence upon such analysis, whether to carry out the query process on the database system 8 or the search-engine system 6.

Figure 2:
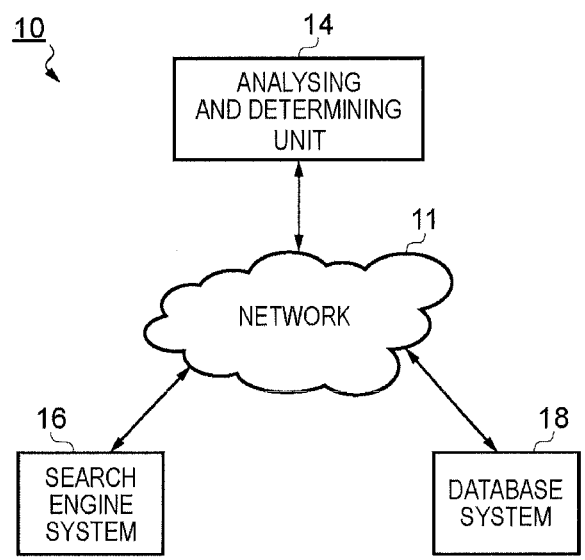
FIG. 2 is a schematic diagram of another query system.

FIG. 2 is a schematic diagram of a query system 10, which is similar to query system 1. However, rather than essentially being a local device such as device 2, query system 10 is distributed across a network 11.

Query system 10 comprises analysing and determining unit 14 which also may be a computer device, a search-engine system 16 and a database system 18 distributed across network 11. Network 11 may be considered to be a LAN (Local Area Network) or a WAN (Wide Area Network), such as the Internet, or any other communications network (wired or wireless), or any combination of such networks.

Analysing and determining unit 14, search-engine system 16 and database system 18 may be considered to be similar to analysing and determining unit 4, search-engine system 6 and database system 8, respectively.

As will be appreciated by way of FIGS. 1 and 2, the query systems (and related methods and computer programs) considered herein may be configured in localised and distributed forms.

Figure 3:
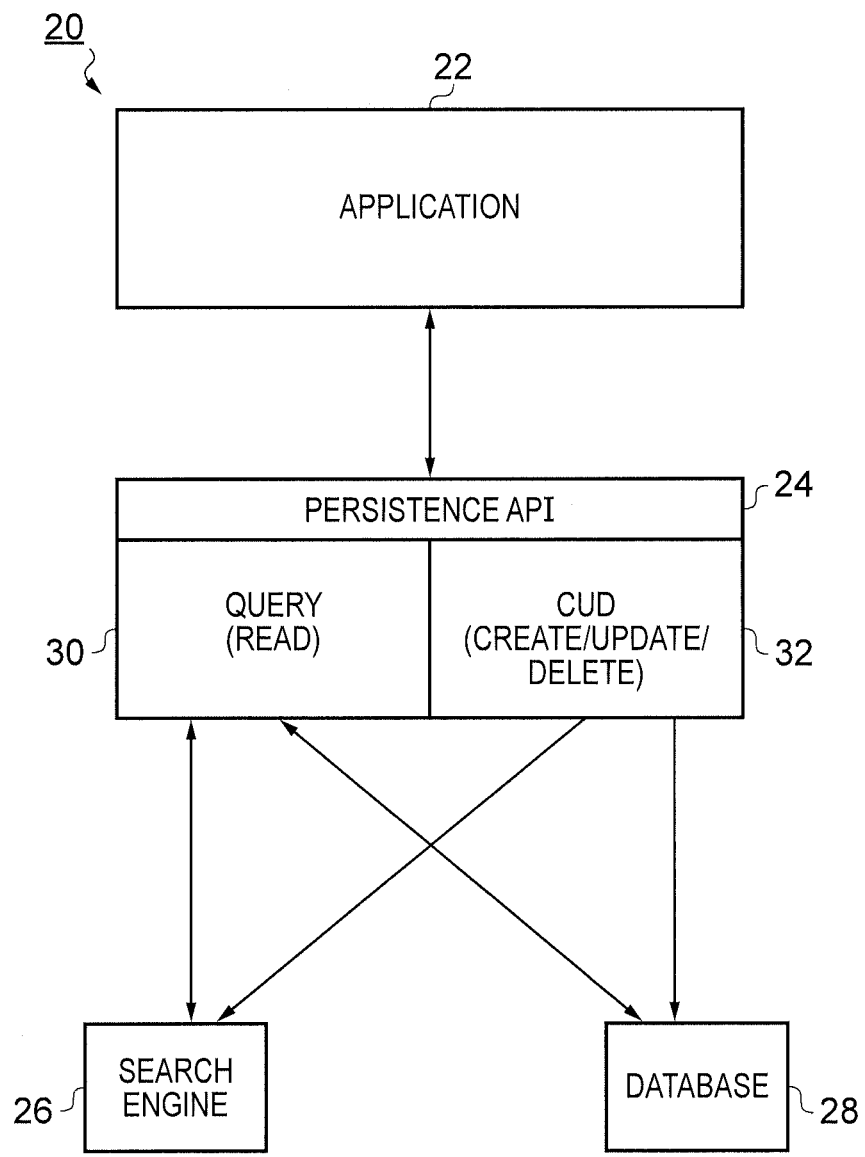
FIG. 3 is a schematic diagram representing a system architecture which may apply to the systems of FIGS. 1 and 2.

FIG. 3 is a schematic diagram representing a system architecture 20 (a simplified "hybrid-query architecture") which may be adopted by query systems considered herein. For example, where such systems are provided in software form (e.g. as a computer program or suite of computer programs which may reside on a non-transitory computer readable medium, such as RAM or ROM or CD), the system architecture 20 may represent a possible organisation of such software.

The system architecture 20 comprises an application 22, a persistence API (Application Programming Interface) 24, a search engine 26 and a database 28.

Application 22 may be considered to be a user application, and may receive inputs from a user and present results to the user. Persistence API 24 is positioned between the application 22 and the search engine 26 and database 28, and interacts with the search engine 26, database 28 and the application 22.

Persistence API 24 has a query function 30 and a CUD (create/update/delete) function 32.

As will become apparent, query function 30 assists in the conducting of searches based on queries submitted by a user via the application 22. That is, based on a received query, query function 30 may be operable to determine whether to carry out a query process on the database 28 or the search engine 26, and to access the database 28 and/or the search engine 26 to perform the query process.

Even if the query process is carried out on the search engine 26, data corresponding to the search results may be retrieved from the database 28, if the database 28 (as apposed to the search engine 26) is configured to be the "dependable" or "master" store of the source data. If a received query is formed of a plurality of query elements, a query process per element may be performed, with each such process being performed on the database 28 or the search engine 26 as determined by the query function 30.

CUD function 32 assists in ensuring that when a data change is made in the database 28 an equivalent change is made in the search engine 26. For example, when data is created, updated or deleted in the database, the CUD function 32 arranges for an equivalent change to be made in the search engine 26, for example in the index/indices of the search engine 26. Thus, CUD function 32 serves to keep database 28 and search engine 26 consistent with one another. Such changes made in the search engine 26 could be made eagerly, for example as soon as the corresponding change is made in the database, or lazily, for example at a later date such as when a query is submitted.

Where a search engine (search-engine system) has more than one index, the term "index" used herein may be considered to refer to any one or more of those indices individually or collectively.

Together, query function 30 and CUD (create/update/delete) function 32 could be considered to have so-called CRUD (create/read/update/delete) functionality, for example covering desired database operations.

It will be appreciated that search engine 26 and database 28 correspond to search engine systems 6 and 16, and database systems 8 and 18, respectively. Moreover, it will be appreciated that analysing and determining unit 4 and 14 may be implemented by way of persistence API 24, in particular employing query function 30, in some instances in conjunction with application 22.

Therefore, it will be understood that system architecture 20 may be implemented on a computing device such as computing device 2 (in line with FIG. 1). Alternatively, system architecture 20 may be implemented with application 22 and persistence API (Application Programming Interface) 24 implemented on one machine, such as a client machine, and with search engine 26 and database 28 being implemented on separate networked servers (in line with FIG. 2).

Such a query system may employ a previously-considered database system "as is", without requiring specific changes to support a hybrid query in accordance with the functionality disclosed herein. However, query systems as disclosed herein preferably serve to keep the database and search-engine systems consistent with one another, preferably fully (e.g. 100%) consistent with one another, and therefore consider (look to maintain) a relationship between the database and search-engine systems.

Data entries themselves will now be considered.

A data entry may be represented as an entity (an object in the context of object-oriented systems may be considered to be a type of entity) having attributes. For example, a document entity may have a date attribute (e.g. "25/12/2010") as an attribute representing a creation date, or an employee entity may have a number attribute (e.g. "12345") representing the employee's company ID number.

The query systems disclosed herein may be configured to represent all attributes as text, i.e. in text form or as a text-centric attribute. For example, an integer 100 may be represented as "00000100" in text form. As another example, a date may be stored in text form, for example like "2010/01/05 PDT 10:50:50", instead of in its common numerical representation.

Individual attributes may then be put into the search engine's index as key-value pairs, where the key is the representation of the entity and the value is the representation of one of its attributes (e.g. value="myDate=12/24/2009").

Accordingly, such query systems do not impose narrow restrictions on data types, since all data may be represented in text form. In theory, one could transform any bit sequence (thus any data) into a string. Therefore, all data may be represented in "text-centric" form.

All entities of the database may be entered into the index of the search engine, by conversion into text form if necessary. In this way, all entities of the database may also be searchable by way of the search engine, for example so that selection queries may be performed on a per-entity basis.

In order to allow more flexible queries, stored entity data may be enhanced with foreign entity data according to a target scenario. Similar to foreign-key relationships in relational databases, one may introduce such foreign keys into the search-engine index thus mimicking relations which are typically not used in previously-considered search-engine indexes.

A query may target a relationship between two entities, using the power of the search engine. This approach could, in theory, replace most of the query aspects of the database. However, at some stage the performance could deteriorate relative to that of querying the database, because purely text-centric operations may be expensive (in terms of resources) for the search engine.

It is recognised that such flexibility does not come for free. In order to be able to query multiple query engines (search engines and databases) the data is replicated in each of them. This data redundancy is naturally "expensive" in terms of storage space. However, a medium-sized database may hold some Gigabytes of data whereas currently-available HDDs (Hard Disk Drives) can store multiple Terabytes. Thus, the "expense" may be considered to be relatively low, or tolerable, considering the searching flexibility obtained.

In order to better understand the present query systems, the following example will be considered.

FIG. 4 is an example of a simple table (entitled "Phone-Numbers") which may be realised in a relational database.

The left-hand column in the table is for a primary key (PrimaryKey), which uniquely identifies a data row. Each row is accordingly a data entry. The middle column is for the name (Owner) of the owner of the telephone number corresponding to each data entry, and the name is represented by data of type "string". The right-hand column is for identifying the telephone number (PhoneNumber) corresponding to each data entry, and the number is represented by data of type "integer".

It can be seen from FIG. 4 that Harry and his wife have two phone numbers each, and that they share one of them.

Continuing the example, a row in the database could be identified using a query as follows (SQL-like syntax is used, for ease of understanding):

select PrimaryKey from PhoneNumbers
where Owner="Harry Hirsch" and PhoneNumber="2402333333"

Such a query would return "PrimaryKey=4873328390".

In order to be able to use such a query across both environments (database and search engine), a similar scheme may be employed for the search engine. As mentioned above, search engines typically do not store complex data, and typically only handle 2-tuples (i.e. pairs) of data—typically called the "document" (an ID) and a value or word.

There are various strategies for converting the data of the FIG. 4 table into pairs of data for use in the search engine. In the present example, a so-called "inverted index" is used to create the inverted index shown in FIG. 5.

In FIG. 5, the "Document" is equivalent to the "PrimaryKey" in the database. In the "inverted index", a "Word" is associated with one or more "Documents". As can be seen in FIG. 5, a single database row is split into multiple entries in the index. However, the amount of data is roughly equivalent to that stored in the database, with the required amount of storage space being a little higher for the index.

As shown in FIG. 5, the Word portion contains the table name of the table (see FIG. 4) stored in the database. This can be important as the attribute names may only be unique within a single table and not across all tables.

The result of the above example SQL statement can thus be achieved in the search engine via an intersection:

documentsA=documents("PhoneNumbers/Owner=Harry Hirsch")=4873328390, 4873328393
documentsB=documents("PhoneNumbers/PhoneNumber=2402748345")=4873328390, 4873328391
result=documentsA ∩ documentsB=4873328390

Naturally, the above example is only one example of how data stored in a database may also be made available to a search engine. Broadly speaking, embodiments may be considered to have synchronisation unit operable to handle the storing of data such that it is available to both the search-engine system and the database system.

Figure 6:
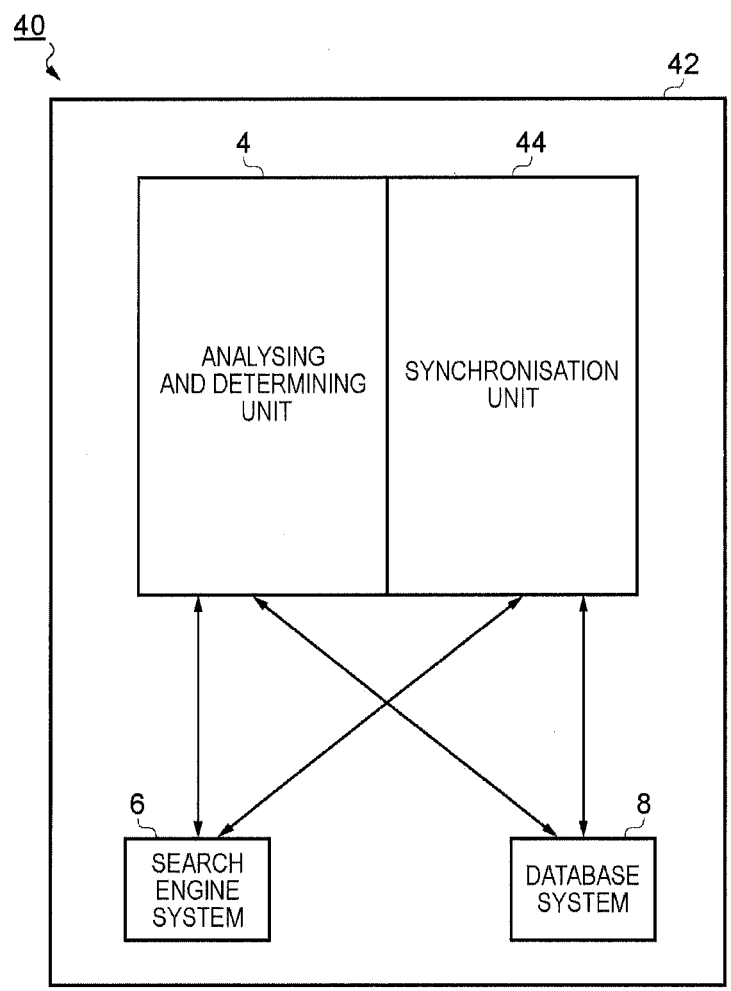
FIG. 6 is a schematic diagram of another query system.

FIG. 6 is a schematic diagram of a query system 40. Query system 40 is similar to query system 1, and comprises a computing device 42. The computing device 42 comprises an analysing and determining unit 4, a search-engine system 6 and a database system 8. Additionally, query system 40 comprises a synchronisation unit 44. It will be appreciated that query system 40 could also be provided in distributed form, similar to query system 10.

Synchronisation unit 44 is operable, as a non-text-centric synchronisation process, to convert a non-text-centric entity (data entry) of database system 8 (after it has been stored in database system 8, before it has been stored in database system 8, or during the storage process) into a corresponding text-centric entity (data entry) representative of that non-text-centric entity, and to enter the text-centric entity into an index of the search-engine system 6. The entry (index entry) may be made into the index together with correspondence information linking (or associating) the or each entry in the index resulting from that text-centric entity to its corresponding non-text-centric entity of the database system 8, so that the two systems 6 and 8 are referenced relative to one another.

The synchronisation unit 44 may be operable to carry out the non-text-centric synchronisation process in respect of all non-text-centric entries of the database system.

Similarly, synchronisation unit 44 is operable, as a text-centric synchronisation process, to enter a text-centric entity of the database system 8 (after it has been stored in database system 8, before it has been stored in database system 8, or during the storage process) into the index of the search-engine system 6. The entry may be made into the index together with correspondence information linking the or each entry in the index resulting from that text-centric entity to its corresponding text-centric entity of the database system, so that the two systems 6 and 8 are referenced relative to one another.

The synchronisation unit 44 may be operable to carry out the text-centric synchronisation process in respect of all text-centric entries of the database system.

Such synchronisation unit 44 may be operable, when a change is made to data searchable by the query system, to cause the change to be represented in both the database system 8 and the search-engine system 6. Such a change may be the creation of new data, the updating of existing data or the deleting of existing data, such data being, for example, data of the database.

Accordingly, it will be appreciated that synchronisation unit 44 may correspond to the CUD function 32 in FIG. 3.

The above example queries (represented in SQL) are only example queries, and there are of course may other types of query which may be performed on a database system or a search-engine system. The speed and/or quality can differ depending on which system the query is performed on. For example, the above example presented in connection with FIGS. 4 and 5 may work better on a (relational) database system (RDBMS) than on a search-engine system.

Where a query may be performed on either system, the present query systems may seek to employ whichever data handling system will provide the best performance in particular circumstances, thus taking advantage of the best of both worlds (databases and search engines).

The synchronisation of the two systems, i.e. the search-engine and database systems, will now be considered further.

Search-engine and database data may be synchronized in order to be able to perform just-in-time queries. Such synchronisation may be carried out by controlling creation/update/deletion (CUD) operations, by way of CUD function 32 or synchronisation unit 44.

Preferably, such CUD operations are shielded by a transaction scope so that a failure to perform an operation on one of the data handling systems (search-engine or database system) will rollback the operation on the other one. Atomicity of a CUD operation is therefore (only) achieved if the operation is performed on both data handling systems.

Figure 7:
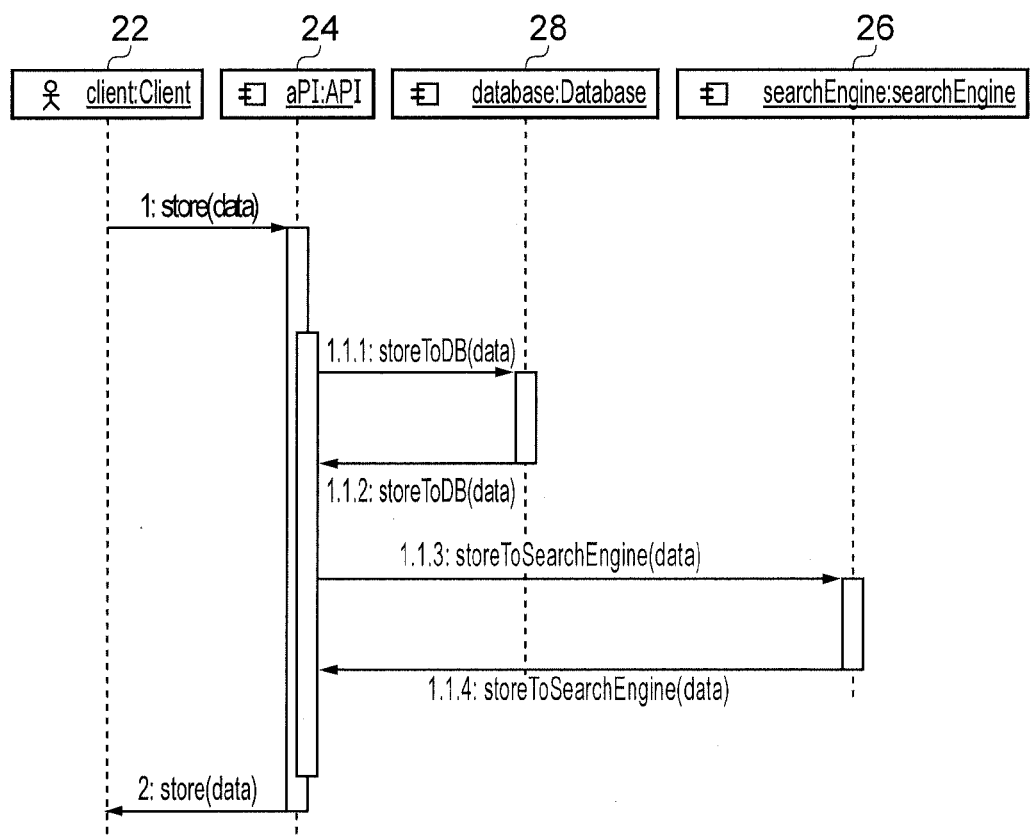
FIG. 7 is a schematic diagram indicating how the various elements in the FIG. 3 architecture may be employed when performing a CUD (creation/update/deletion) operation.
Figure 8:
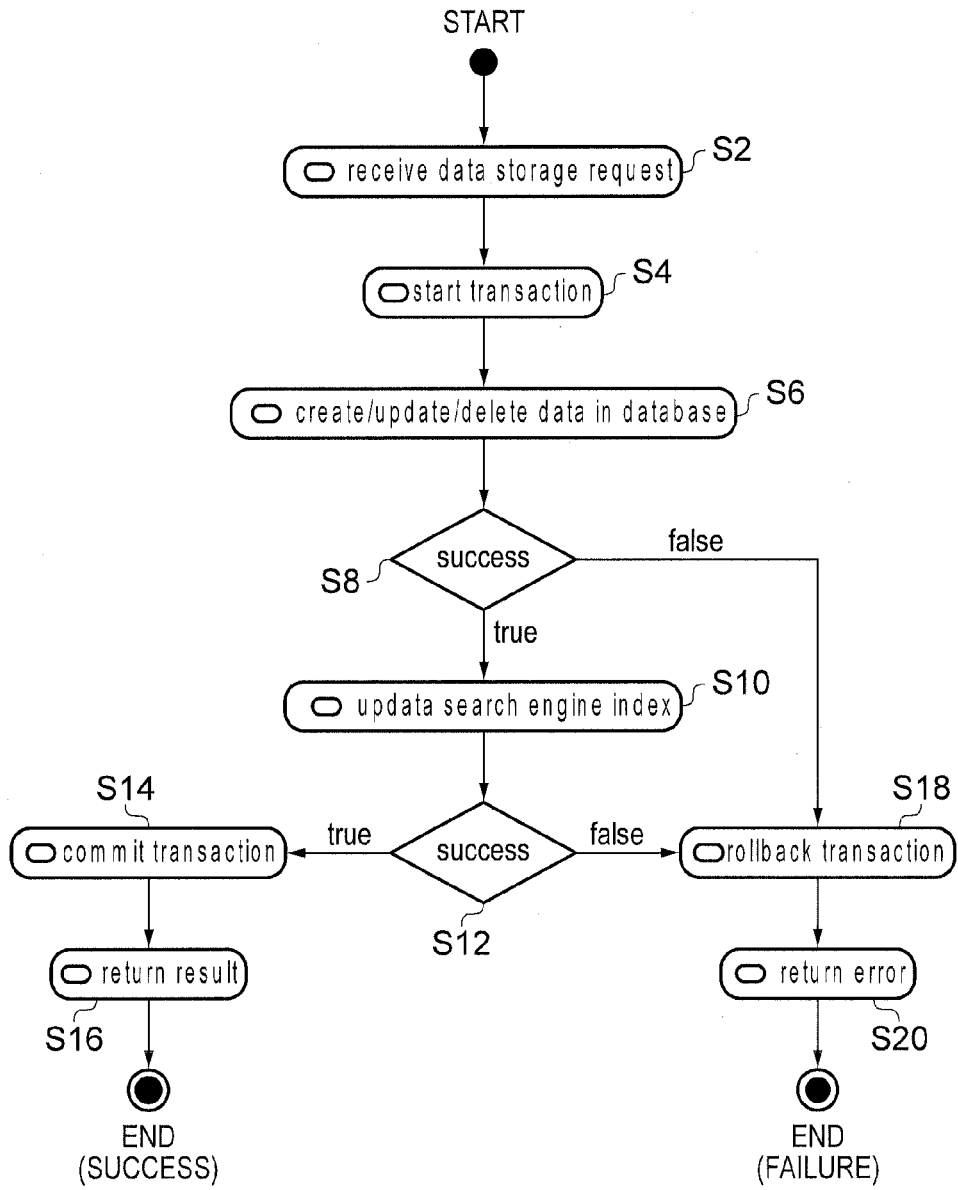
FIG. 8 is an activity diagram corresponding to FIG. 7.

In this respect, reference is made to FIGS. 7 and 8.

FIG. 7 is a schematic diagram prepared with the FIG. 3 system architecture 20 in mind, indicating how the various elements in the architecture may be employed when performing a CUD operation.

The various elements of the architecture 20 are represented in FIG. 7 by boxes along the top, denoted by the same reference numerals as employed in FIG. 3 for ease of comparison. For example, the box labelled "client:Client" in FIG. 7 corresponds to the application 22 of FIG. 3. The various activities represented in FIG. 7 are labelled 1, 1.1.1, 1.1.2, 1.1.3, 1.1.4, and 2, and a referred to below.

FIG. 8 is an activity diagram corresponding to FIG. 7, illustrating the transaction context of a CUD operation. The various steps represented in FIG. 8 are labelled as even-numbered steps from S2 to S20, and are referred to below.

As can be seen, a CUD operation may be initiated by the application 22, for example in response to a user request made on a client machine. This is represented by step or operation S2 in FIG. 8.

The application 22 may then start a CUD transaction (step S4, FIG. 8), and, considering an overall "store" transaction/operation (a create operation) by way of example, this is followed as the beginning of the store operation in FIG. 7 as activity 1.

The API 24 then interacts with the database 28 to store the new data in step S6 and it is determined whether this store operation has been successful in step S8, with corresponding activities 1.1.1 and 1.1.2 in FIG. 7.

If the store operation in respect of the database 28 is successful (true, step S8), the method moves on to step S10.

In step S10, the API 24 interacts with the search engine 26 to store the new data (for example, by making entries in the search engine's index) and it is determined whether this store operation has been successful in step S12, with corresponding activities 1.1.3 and 1.1.4 in FIG. 7.

If the store operation in respect of the search engine 26 is successful (true, step S12), the method moves on to step S14, in which the overall store transaction is committed, i.e. considered successful. A result (indicating success) is then returned to the user at step S16, with corresponding activity 2 in FIG. 7.

Of course, it may be that the step S6 or S10 is unsuccessful. In that case (false, step S8 or S12), the transaction is rolled back in step S18. The transaction should (for atomicity) span across the database and the search engine, and may thus be referred to as a "distributed transaction". That is, if the transaction does not span across the database and the search engine successfully then any change that has been made is undone or reversed so that the search engine 26 and database 28 are in a condition as if the transaction had not been started. The method then proceeds to step S20, in which a result (indicating failure) is returned to the user.

The handling of queries, or query requests, will now be considered further.

As mentioned above, where a query may be performed on the search-engine or database system, the present query systems seek to employ whichever data handling system will provide the best performance in particular circumstances, thus taking advantage of the best of both worlds (databases and search engines).

In the present embodiment, a query request (submitted by a user—who may be a person or another application or system) is interpreted by a hybrid query engine of the system, implemented by way of the analysing and determining unit (see the analysing and determining unit 4 and 14, in FIGS. 1, 2, and 6, and the corresponding query function 30 of the API 24 in FIG. 3).

A query may be simple, for example effectively requiring only one query process to be carried out, or it may be complex, for example requiring several query processes to be carried out and the results of those processes to be assembled together or combined in some way.

In the case of a complex query, the query may be divided for example using an abstract syntax tree (AST) strategy. In simple terms, a complex query may be divided into a set of atomic operations which can then be executed. This approach (or a similar one, for example using LR or LL grammars) may be implemented with previously-considered methods of dividing up queries, however it will be understood that the present query systems are capable of heterogeneous execution on multiple data handling systems (for example, on database and search-engine systems) instead of on just a single one.

Such atomic operations may be considered in terms of whether they constitute "selection" or "non-selection" operations. An aim may be to identify "qualifying" selection operations which reside within the scope of a search engine. For example, search engines are typically fundamentally based on keyword or vocabulary techniques, and operations relying on these techniques may be identified.

A qualifying selection can be identified by the type of filtering criteria specified by the query, or relevant element of the query, for example:

1. search-engine centric expressions which are simply not available in within the scope of the database, such as expressions which involve:
   phonetic similarities (fuzzy search)
   stemming (expansion of words with common endings to include plurals, past tenses, etc.)

a proximity search (e.g. "information system~3" retrieves records where the words 'information' and 'system' are within three words' distance from one another)

2. regular expressions performed on non-text attributes, for example:

date="19[5|6][0 . . . 9]/01/01".

3. operations on BLOB attributes (from a database perspective) like binary documents (e.g. a MS Word document).

All though some operations of types 1) and 3) may be supported in some databases, operations of type 2) are typically not.

Figure 9:
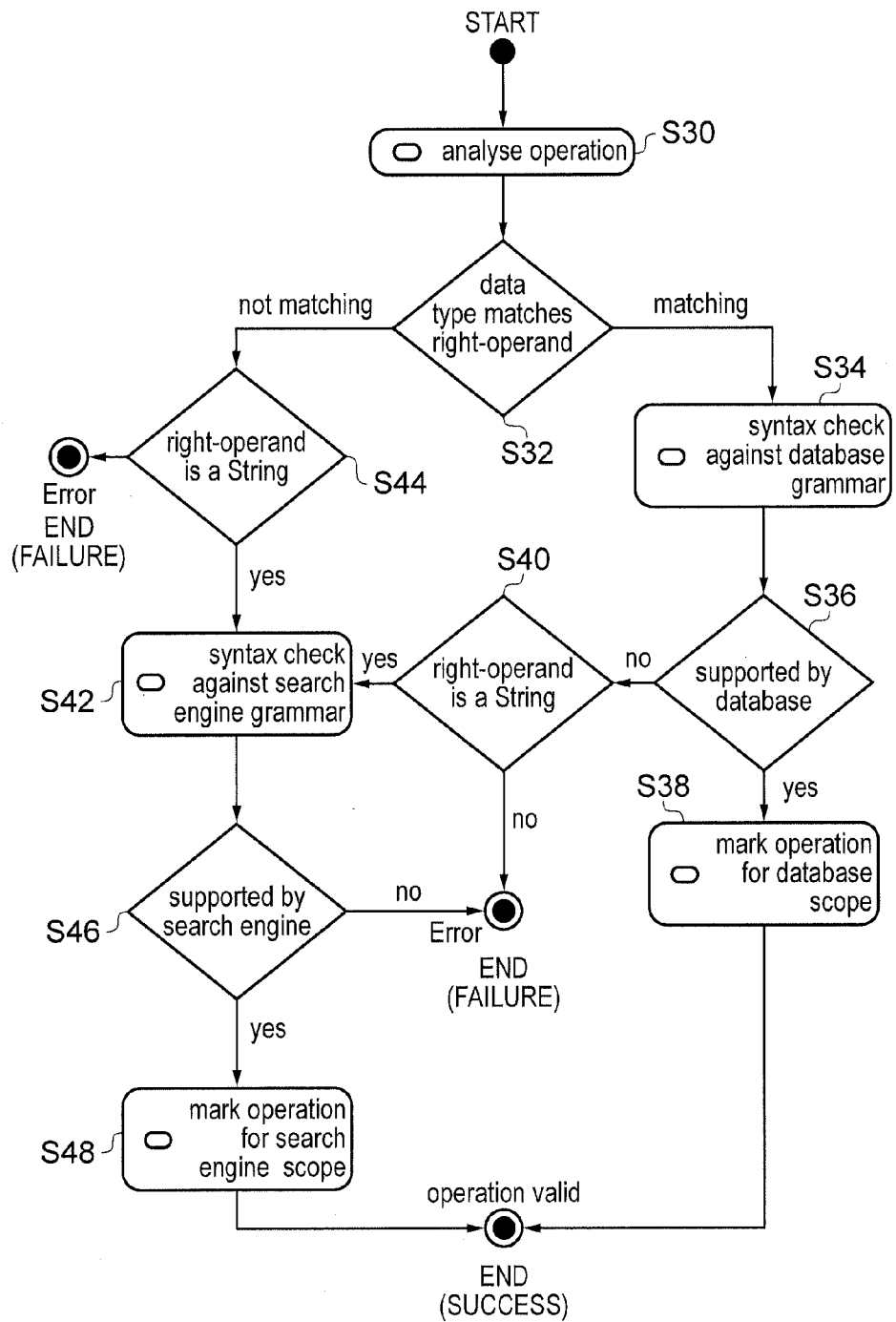
FIG. 9 is a flow diagram representing a method which may be employed to determine whether to carry out a particular query process on a database system or a search-engine system.

Reference will now be made to FIG. 9, which is a flow diagram representing a method which may be employed to determine whether to carry out a particular query process (corresponding to a query element of a query) on a database system or a search-engine system. That is, the flow diagram of FIG. 9 pertains to the division between database and search-engine scope.

By way of overview, an operation (a query element) may be analyzed according to its data type and operand. If the data type and operand match, it may be deduced that the operation should be processed by the database (if the operation complies with the database's grammar). If not, the operation may be checked against the search engine capabilities, and processed by the search engine if possible.

The flow diagram of FIG. 9 comprises even-numbered steps S30 to S48.

In step S30, the operation (a query element) is analysed. If it is determined that the data type specified in the operation matches the right-operand specified in the operation (matching, step S32), the method proceeds to step S34. Otherwise (not matching, step S32), the method proceeds to step S44.

In step S34, the syntax of the operation is checked against the database grammar. If it is determined that the syntax of the operation conforms to the database grammar (yes, step S36), the method proceeds to step S38. Otherwise (no, step S36), the method proceeds to step S40.

In step S38, the operation is marked as being within the scope of the database, i.e. it is determined that the operation should be carried out on the database, and the method ends successfully.

In step S40, it is checked whether the right-operand of the operation is a String (i.e. of type "String"). If it is determined that the right-operand of the operation is a String (yes, step S40), the method proceeds to step 42. Otherwise (no, step S40), the method ends unsuccessfully and an error is recorded/output.

In step S44, similarly to step S40, it is checked whether the right-operand of the operation is a String (i.e. of type "String"). If it is determined that the right-operand of the operation is a String (yes, step S44), the method proceeds to step 42. Otherwise (no, step S44), the method ends unsuccessfully and an error is recorded/output.

In step S42, the syntax of the operation is checked against the search-engine grammar. If it is determined that the syntax of the operation conforms to the search-engine grammar (yes, step S46), the method proceeds to step S48. Otherwise (no, step S46), the method ends unsuccessfully and an error is recorded/output.

In step S48, the operation is marked as being within the scope of the search engine, i.e. it is determined that the operation should be carried out on the search engine, and the method ends successfully.

In order to further understand the present functionality, an example will be considered in conjunction with FIG. 10. FIG. 10 represents an example complex query (presented using SQL-like syntax for ease of understanding), and assumes an ANSI-standard-compliant relational database and a previously-considered search engine.

This example assumes two entities—one contains the basic data about employees and the other contains skill information.

The example also assumes a desire to have the résumés for all persons with a first name similar to "Jack", born in the 1950s or 60s, having some engineering background in chemistry, electrical science or some kind of "geo" discipline, and assumes that the results should be grouped according to the employer company.

As indicated in FIG. 10, some portions of the query are determined to be more suitable for execution on the database, and others are determined to be more suitable for execution on the search engine.

The following division may be considered:

people.birthDate='19[5|6][0 . . . 9]/??/??'

A database (DB) will typically store a "date" object in its native format—usually a number (e.g. typically milliseconds or seconds since 1 Jan. 1970). The query parser can analyse the query condition and recognize that it can't be processed by the database because a regular expression is associated with a data type which is incompatible to the condition. However, the search engine may process this.

people.firstName='Jack~'

This is a very typical search engine request. The "~" signals the intention to return not just all "Jacks" but also people with a phonetically similar name like—say—"Jacqline".

skills.summary='*engineer* [chemistry|electrical|geo]'

Assuming that the skill summary is stored in a—say—Word™ document (BLOB), it cannot be queried by a typical database so this element may be considered to be another candidate for a search-engine query.

These three conditions can therefore be executed by the search engine. The results are two sets of "skill" and "people" IDs.

These results can be used in the following:

people.id=skill.peopleId

This is a typical join or intersection of two entities based on a shared attribute—this may be performed on the database (although it could also be executed on the search engine, albeit at a lower speed).

group by people.employer

This states that the results should be grouped by employee's employer. A typical search engine cannot group, whereas a relational database can.

Finally, the aim of this example is to output the name of the employee, the employer and the resume of the employee. A typical search engine does not guarantee the data integrity (e.g. it will typically not store a Microsoft Word™ version of the resume), whereas a typical database does. That is, a document put into a (typical, previously-considered) search engine cannot normally be extracted again. The database may thus be of benefit in this portion of the example.

Accordingly, it will be appreciated that, depending on the capabilities of the database and search engine, a rule set may be defined to enable portions of a query to be executed by a specific target environment (search engine or database).

Figure 11:
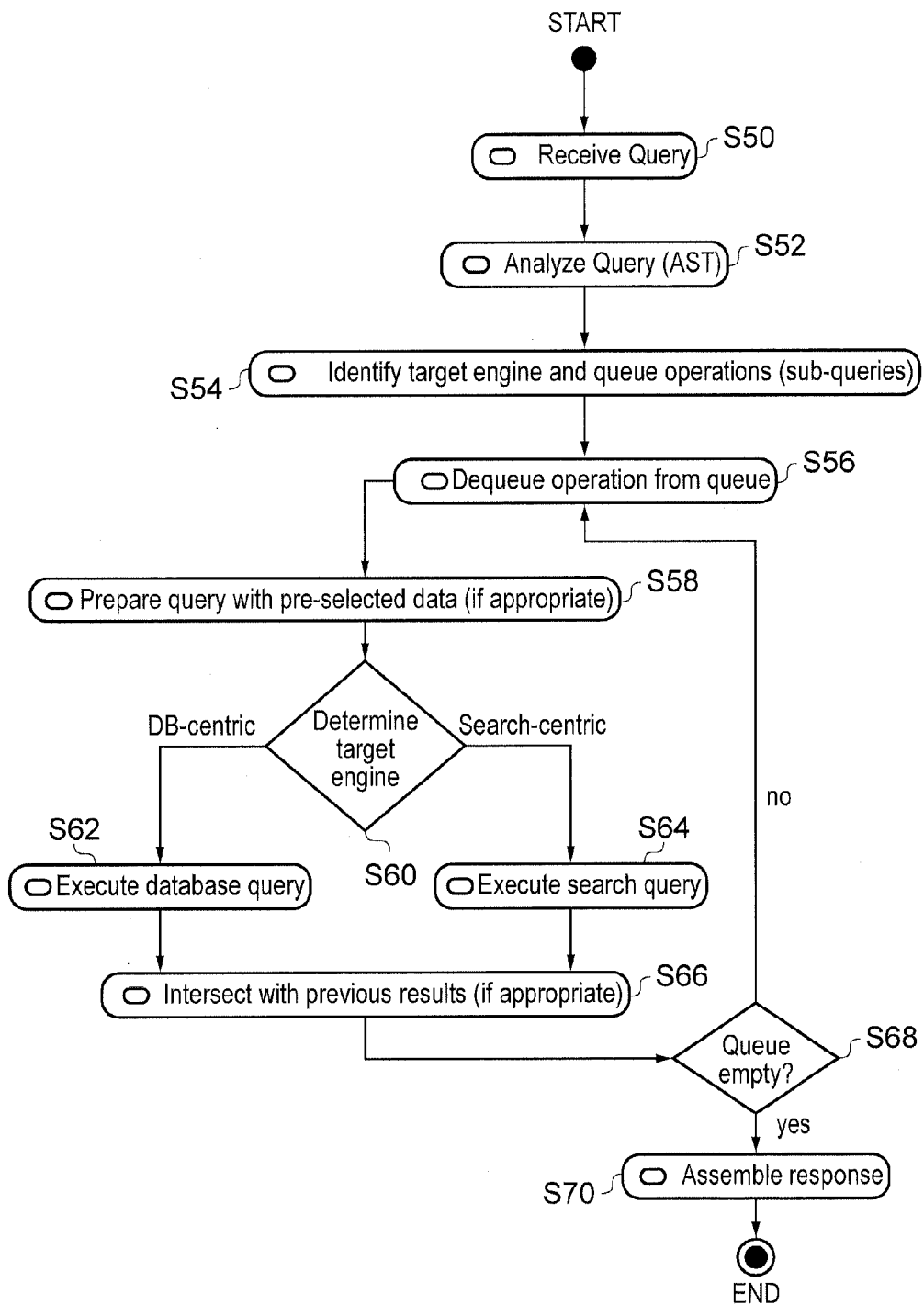
FIG. 11 is a flow diagram representing the procedure involved in dividing a query up into its constituent query elements in abstract.

FIG. 11 is a flow diagram intended to represent the abstract procedure, involved in dividing a query up into its constituent query elements (operations), performing the various operations on the search engine or database in an order, and combining the results in some way.

The FIG. 11 query procedure may be considered to be a hybrid-query activity flow, and may be considered as having the following abstract steps:

1. analysis of the query
2. generation of an abstract syntax tree (AST)
3. identification of the target engine (database or search-engine system) for the individual operations
4. queuing of the individual operations
5. looping across the queued operations, executing the operations on the target engine and intersecting the results
6. assembly of the response A number of encapsulated atomic operations may be grouped into sub-queries in order to be executed at once by the target data handling system or "target engine" (i.e. the database or search-engine system). The different sub-queries may then be put in a dedicated operation queue and processed according to their classification (i.e. database-suitable or search-engine-suitable).

The final result objects may then be delivered from the database, because it may be that only the database can assure data integrity and completeness.

The procedure of FIG. 11 comprises evenly-numbered steps S50 to S70.

In step S50, a query (e.g. a complex query) is received.

In step S52, the query is analysed to determine if the query is complex and thus made up of a plurality of query elements (i.e. portions of the query that it is appropriate to handle separately—as for example indicated in FIG. 10). An AST (abstract syntax tree) approach may be adopted in step S52. The query elements of the query are thus identified in this step.

In step S54, each query element is assigned an appropriate "target engine". That is, for each query element, it is determined whether its corresponding query process/operation is to be carried out on the database system or on the search-engine system. The considerations described above in relation to FIG. 10 may, for example, be taken into account when making these decisions.

Also, in step S54, the query operations or processes corresponding to the query elements are queued in an order. The order is one which is appropriate for achieving the desired final result in a short period of time, taking into account any dependencies between the query operations, and the ordering in the original query. Incidentally, although query processes are conducted in a sequential fashion in the FIG. 11 procedure, i.e. one-by-one, the use of two separate "engines" (search engine and database) may allow some of the query operations to be carried out in parallel.

In step S56, the first query operation in the order is de-queued from the queue, and in step S58 it is prepared, if appropriate, with any pre-selected data (for example, for later query operations, with information acquired based on a previous query operation).

In step S60, it is determined for the current query operation whether it is to be carried out on the database or the search engine. If it is determined that the operation is to be carried out on the database (DB-centric, step S60), the method proceeds to step S62 in which a corresponding database query is executed. If it is determined that the operation is to be carried out on the search engine (Search-centric, step S60), the method proceeds to step S64 in which a corresponding search-engine query is executed.

Following either of steps S62 and S64, the method proceeds to step S66 in which the results obtained are intersected with any already-obtained results, and, if appropriate, any pre-selected data.

The method then proceeds to step S68, in which it is determined whether the queue is empty, i.e. whether all of the queued operations have been carried out. If it is determined that the queue is not empty (no, step S68), then the method returns to step S56 in which the next query operation in the order is de-queued from the queue. Otherwise (yes, step S68), the method proceeds to step S70, in which the final response is assembled.

Within a well-defined/known environment, it is also possible to identify further scenarios. For example, when considering an OODBMS it is viable to execute all selections with a table-like result by the search engine simply because the database may be generally too slow for text centric operations.

It is noted that, particularly in network-based embodiments, a trade-off may need to be considered between increased query power and increased network traffic needed to combine the results from multiple data handling systems. Accordingly, embodiments may, rather than employ the query capabilities on a general basis, primarily employ them for text-centric applications which have highly-flexible input requirements.

The hybrid query engine approach presented herein may be considered to have the following benefits:

a) Such a query system may have relatively loosened type constraints on data attributes. As a base, all data may be handled as a string (i.e. in text form) and processed accordingly if needed.

b) The query capabilities of a search engine are combined with those of a database. This flexibility may for example be used to enhance the capabilities of search form fields from an end-user perspective.

c) Such a query system may detect the appropriate target system (database or search engine) according to the characteristic of the right-operation in combination with the data type.

d) By placing the hybrid-query engine on top of the database and the search engine, it may be possible to consider the database and/or the search engine to be "pluggable" (manufacturer independent) assuming use of a standardised or recognised database query language underneath.

The above disclosure considers the preconditions and the strategy for the selection of the most suitable query engine for processing multiple atomic operations and intersecting corresponding result sets in order to increase the performance and capabilities of a complex data query based on a generic database system and search engine.

By way of summary, it will be recognised that embodiments of the present invention advantageously need not make tight assumptions on the attribute type (the attribute domain) targeted by a query element. For example, it may be comparatively irrelevant whether e.g. a date query element is entered "like a conventional date object" (to be process by the database system) or "in a certain string representation" (to be processed by the search-engine system). Attributes may be stored (in some instances, always stored) into both the database and search-engine systems, to make this possible. The overall query may, of course, need to match a defined syntax, but the degrees of freedom/power of the query may be expanded compared to that of previously-considered systems. Embodiments of the present invention may be described as being "for use in carrying out a query process corresponding to a query element without making tight assumptions on the domain of the query operand".

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a non-transitory computer-readable medium, or it could, for example, be in the form of a signal such as a downloadable data signal provided from an Internet website, or it could be in any other form.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that unit one or more of A, B and C may be used, contrary to the holding in Superguide v. DIRECTV, 358 F3d 870, 69 USPQ2d 1865 (Fed. Cir. 2004).

The invention claimed is:

1. A computer-implemented query system for carrying out a query process corresponding to a received query element on a database system and/or a search-engine system, the query system comprising:
   a synchronisation unit, comprising a processor, operable, as a non-text-centric synchronisation process, to convert a non-text-centric data entry of the database system into a corresponding text-centric data entry representative of the non-text-centric data entry, and to enter the text-centric data entry into an index of the search-engine system making the non-text-centric data entry of the database system available to both the search-engine and database systems;
   a query-dividing unit operable to divide a received query into a plurality of component query elements, the query system being operable to carry out a query process per query element;
   an analyzing unit operable, for each query element, to analyze the query element for use in carrying out the query process corresponding to that query element;
   a determining unit operable to determine, for each query element in dependence upon such analysis, whether to carry out the query process on the database system and/or the search-engine system; and
   an execution unit operable, for each query element, to carry out the query process directly on the database system without using the index of the search-engine system, when it is determined that the query process is to be carried out on the database system, and/or directly on the search-engine system using the index of the search-engine system, when it is determined that the query process is to be carried out on the search-engine system, wherein:
   the synchronisation unit is operable in said non-text-centric synchronisation process to enter the text-centric data entry into the index of the search-engine system together with correspondence information associating each index entry in the index resulting from that text-centric data entry to its corresponding non-text-centric data entry of the database system, and, when a change is made to information searchable by said query system, to cause the change to be represented in both the database system and the search-engine system; and
   the determining unit is operable, for each query element, if the analysis indicates that the query element relates to a search expression supported by the database system, to determine that the query process is to be carried out on the database system, and, if the analysis indicates that the query element relates to a search expression not supported by the database system but supported by the search-engine system, to determine that the query process is to be carried out on the search-engine system.

2. A computer-implemented query system as claimed in claim 1, wherein the synchronisation unit is operable to carry out the non-text-centric synchronisation process in respect of all non-text-centric entries of said database system.

3. A computer-implemented query system as claimed in claim 1, wherein the synchronisation unit is operable, as a text-centric synchronisation process, to enter a text-centric data entry of the database system into the index of the search-engine system together with correspondence information associating the or each index entry in the index resulting from that text-centric data entry to its corresponding text-centric data entry of the database system.

4. A computer-implemented query system as claimed in claim 3, wherein the synchronisation unit is operable to carry out the text-centric synchronisation process in respect of all text-centric entries of said database system.

5. A computer-implemented query system as claimed in claim 1, wherein said change is the creation of a new data entry, the updating of an existing data entry or the deletion of an existing data entry.

6. A computer-implemented query system as claimed in claim 1, wherein said determining unit is operable, if the analysis indicates that the query element relates to a search-engine-centric selection operation, to determine that the query process is to be carried out on the search-engine system.

7. A computer-implemented query system as claimed in claim 1, further comprising a queuing unit operable to queue the plurality of query elements in an order dependent upon said received query, wherein the query system is operable to carry out a said query process per query element in said order.

8. A non-transitory computer readable storage storing a computer program which, when executed on a computing apparatus of a query system, the query system being for carrying out a query process corresponding to a received query element on a database system and/or a search-engine system, causes the apparatus to carry out a query-system method, the method comprising:
   as a non-text-centric synchronisation process, converting a non-text-centric data entry of the database system into a corresponding text-centric data entry representative of the non-text-centric data entry, and entering the text-centric data entry into an index of the search-engine system so that the non-text-centric data entry of the database system is available to both the search-engine and database systems,
   dividing a received query into a plurality of component query elements, the query system being operable to carry out a query process per query element;
   analyzing, for each query element, the query element for use in carrying out the query process corresponding to that query element;

determining, for each query element in dependence upon such analysis, whether to carry out the query process on the database system and/or the search-engine system; and for each query element, carrying out the query process directly on the database system without using the index of the search-engine system, when it is determined that the query process is to be carried out on the database system, and/or directly on the search-engine system using the index of the search-engine system, when it is determined that the query process is to be carried out on the search-engine system, wherein the method further comprises:

entering the text-centric data entry into the index of the search-engine system together with correspondence information associating each index entry in the index resulting from that text-centric data entry to its corresponding non-text-centric data entry of the database system, and when a change is made to information searchable by said query system, to cause the change to be represented in both the database system and the search-engine system; and for each query element, if the analysis indicates that the query element relates to a search expression supported by the database system, determining that the query process is to be carried out on the database system, and, if the analysis indicates that the query element relates to a search expression not supported by the database system but supported by the search-engine system, determining that the query process is to be carried out on the search-engine system.

9. A computer-implemented method, comprising:

converting a non-text-centric data entry of a database system of a query system into a corresponding text-centric data entry representative of the non-text centric data entry; and entering the text-centric data entry into an index of a search-engine system of the query system, dividing a received query into a plurality of component query elements, the query system being operable to carry out a query process per query element;

analyzing, for each query element, the query element for use in carrying out the query process corresponding to that query element;

determining, for each query element in dependence upon such analysis, whether to carry out the query process on the database system and/or the search-engine system; and for each query element, carrying out the query process directly on the database system without using the index of the search-engine system, when it is determined that the query process is to be carried out on the database system, and/or directly on the search-engine system using the index of the search-engine system, when it is determined that the query process is to be carried out on the search-engine system, wherein the method further comprises:

entering the text-centric data entry into the index of the search-engine system together with correspondence information associating each index entry in the index resulting from that text-centric data entry to its corresponding non-text-centric data entry of the database system, and when a change is made to information searchable by said query system, causing the change to be represented in both the database system and the search-engine system; and for each query element, if the analysis indicates that the query element relates to a search expression supported by the database system, determining that the query process is to be carried out on the database system, and, if the analysis indicates that the query element relates to a search expression not supported by the database system but supported by the search-engine system, determining that the query process is to be carried out on the search-engine system.

10. A computer-implemented method as claimed in claim 9, further comprising creating correspondence information associating each index entry in the index resulting from that text-centric data entry to its corresponding non-text-centric data entry of the database system.

* * * * *

UNITED STATES PATENT AND TRADEMARK OFFICE
CERTIFICATE OF CORRECTION

PATENT NO. : 9,063,957 B2
APPLICATION NO. : 13/323301
DATED : June 23, 2015
INVENTOR(S) : Klaus Schroiff et al.

Page 1 of 1

It is certified that error appears in the above-identified patent and that said Letters Patent is hereby corrected as shown below:

In the claims

Claim 1, Column 21, Line 32

After "comprising:" insert --a computer processor;--.

Signed and Sealed this
Twentieth Day of October, 2015

Michelle K. Lee
*Director of the United States Patent and Trademark Office*